US009048925B2

(12) United States Patent
Zirwas

(10) Patent No.: US 9,048,925 B2
(45) Date of Patent: Jun. 2, 2015

(54) METHOD AND DEVICE FOR PROCESSING DATA AND COMMUNICATION SYSTEM COMPRISING SUCH DEVICE

(75) Inventor: Wolfgang Zirwas, München (DE)

(73) Assignee: Adtran GmbH, Berlin-Siemensstadt (DE)

( * ) Notice: Subject to any disclaimer, the term of this patent is extended or adjusted under 35 U.S.C. 154(b) by 1089 days.

(21) Appl. No.: 12/602,243

(22) PCT Filed: May 5, 2008

(86) PCT No.: PCT/EP2008/055475
§ 371 (c)(1),
(2), (4) Date: Dec. 18, 2009

(87) PCT Pub. No.: WO2008/145479
PCT Pub. Date: Dec. 4, 2008

(65) Prior Publication Data
US 2010/0138556 A1 Jun. 3, 2010

(30) Foreign Application Priority Data
May 29, 2007 (EP) .................................... 07010642

(51) Int. Cl.
*G06F 15/16* (2006.01)
*H04J 1/12* (2006.01)
*H04J 3/10* (2006.01)
*H04B 3/32* (2006.01)
*H04L 25/08* (2006.01)
*H04L 5/00* (2006.01)

(52) U.S. Cl.
CPC ........ *H04B 3/32* (2013.01); *H04L 25/08* (2013.01); *H04L 25/085* (2013.01); *H04L 5/0073* (2013.01)

(58) Field of Classification Search
CPC ........ H04B 3/32; H04L 5/0073; H04L 25/08; H04L 25/085
USPC .................. 709/232, 236, 238, 245; 370/201
See application file for complete search history.

(56) References Cited

U.S. PATENT DOCUMENTS

| 4,730,311 | A | * | 3/1988 | Carse et al. ................... 370/522 |
| 6,144,695 | A | * | 11/2000 | Helms et al. ................... 375/222 |
| 6,618,395 | B1 | * | 9/2003 | Kimmitt ....................... 370/473 |
| 6,717,950 | B2 | | 4/2004 | Lui et al. |

(Continued)

FOREIGN PATENT DOCUMENTS

| CN | 1479979 A | 3/2004 |
| CN | 1496632 A | 5/2004 |

(Continued)

OTHER PUBLICATIONS

International Search Report with Written Opinion dated Jun. 12, 2008.

(Continued)

*Primary Examiner* — Brian J Gillis
(74) *Attorney, Agent, or Firm* — Laurence A. Greenberg; Werner H. Stemer; Ralph E. Locher

(57) ABSTRACT

A method and a device for processing data has data transmitted from a first network component to at least one second network component via at least two lines. According to the novel method the data to be conveyed via the at least two lines is distributed within at least one frame.

16 Claims, 1 Drawing Sheet

(1) precoding
(2) no precoding

(56) References Cited

U.S. PATENT DOCUMENTS

| | | |
|---|---|---|
| 2003/0039306 A1* | 2/2003 | Redfern ............... 375/222 |
| 2003/0112858 A1* | 6/2003 | Wang ................... 375/222 |
| 2003/0208772 A1 | 11/2003 | Milbrandt |
| 2006/0115030 A1* | 6/2006 | Erving et al. ........... 375/348 |
| 2006/0287743 A1* | 12/2006 | Sampath et al. ......... 700/90 |
| 2007/0086477 A1* | 4/2007 | Xiong et al. ........... 370/463 |

FOREIGN PATENT DOCUMENTS

| | | |
|---|---|---|
| EP | 1248426 A2 | 9/2002 |
| JP | 61127242 A | 6/1986 |
| WO | 0235906 A2 | 5/2002 |

OTHER PUBLICATIONS

European Search Report with Written Opinion dated Nov. 29, 2007.

ITU-T G.993.1 Telecommunication Standardization Sector of ITU (Jun. 2004): Series G: Transmission Systems and Media, "Very High Speed Digital Subscriber Line Transceivers".

ITU-T G.993.2 Amendment 1, Telecommunication Standardization Sector of ITU (Apr. 2007): Series G: Transmission Systems and Media, "Very High Speed Digital Subscriber Line Transceivers 2 (VDSL2)", 2006.

* cited by examiner (1) precoding
(2) no precoding

METHOD AND DEVICE FOR PROCESSING DATA AND COMMUNICATION SYSTEM COMPRISING SUCH DEVICE

BACKGROUND OF THE INVENTION

Field of the Invention

The invention relates to a method and to a device for processing data and to a communication system comprising such a device.

DSL or xDSL, is a family of technologies that provide digital data transmission over the wires of a local telephone network.

Asymmetric Digital Subscriber Line (ADSL) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

VDSL (Very High Speed DSL) is an xDSL technology providing faster data transmission over a single twisted pair of wires. High bit rates are achieved at a range of about 300 meters (1000 ft), which allows for 26 Mbit/s with symmetric access or up to 52 Mbit/s in downstream—12 Mbit/s in upstream with asymmetric access.

Currently, standard VDSL uses up to 4 different frequency bands, two for upstream (from the client to the telecom provider) and two for downstream. Suitable modulation techniques are QAM (quadrature amplitude modulation) or DMT (discrete multitone modulation).

According to its high bandwidth, VDSL is capable of supporting applications like HDTV, as well as telephone services (e.g., Voice over IP) and general Internet access, over a single connection.

VDSL2 (Very High Speed Digital Subscriber Line 2) is an access technology that exploits the existing infrastructure of copper wires that were originally used for plain old telephone service (POTS). It can be deployed from central offices, from fiber-fed cabinets preferably located near the customer premises, or within buildings.

VDSL2 is designed to support the wide deployment of Triple Play services such as voice, video, data, high definition television (HDTV) and interactive gaming. VDSL2 enables operators and carriers to gradually, flexibly, and cost efficiently upgrade existing xDSL infrastructure.

ITU-T G.993.2 (VDSL2) is an enhancement to G.993.1 (VDSL) that permits the transmission of asymmetric and symmetric (full duplex) aggregate data rates up to 200 Mbit/s on twisted pairs using a bandwidth up to 30 MHz.

The xDSL wide band modulation approaches are problematic relating to crosstalk interference that is introduced to the twisted pair transmission line and received by the modem.

Crosstalk occurs when wires are coupled, in particular between wire pairs of the same or a nearby bundle that are used for separate signal transmission. Hence, data signals from one or more sources can be superimposed on and contaminate a data signal. The crosstalk comprises a near-end crosstalk (NEXT) and a far-end crosstalk (FEXT).

Based on such crosstalk, data signals transmitted over twisted-pair lines can be considerably degraded by the crosstalk interference generated on one or more adjacent twisted-pair phone lines in the same and/or a nearby multi-core cable or bundle. With an increasing transmission speed, this problem even deteriorates, which may significantly limit a maximum data rate to be transmitted via a single line.

In particular with regard to ADSL or VDSL systems the customer-premises equipments (CPEs) constantly consume power due to their non-stop data transmission, even if there is no user data available. This is a waste of energy, in particular as in cases of IP traffic often only short packages need to be transmitted as user data while the remaining transmission contains idle data only.

Furthermore, idle data sent induce crosstalk interference and hence disturb user data sent via other lines of, e.g., a multi-core cable. As there are typically 50 lines within one multi-core cable, such crosstalk could significantly impair the overall performance of the transmitting capability.

BRIEF SUMMARY OF THE INVENTION

The problem to be solved is to overcome the disadvantage as stated before and to provide an approach for processing data in particular in an xDSL field such that crosstalk interference is reduced and/or minimized.

This problem is solved according to the features of the independent claims. Further embodiments result from the depending claims.

In order to overcome this problem, a method for processing data is provided said data is preferably transmitted from a first network component to at least one second network component via at least two lines, wherein the method comprises the step:

said data to be conveyed via the at least two lines is distributed within a at least one frame.

Preferably, said data is transmitted via frames. In many cases only a portion of the frame is needed for transmitting user data. Such user data can be distribute within the frame in various ways.

In an embodiment, the data is distributed within the at least one frame in order to improve an overall pre-coding gain.

Pre-coding may be used to manipulate data to be transmitted to various second network components via different lines such that, e.g., an overall crosstalk interference is reduced and/or minimized.

In an embodiment, the data to be conveyed via the at least two lines are aligned at the beginning of at least one of the at least one frames.

Hence, lines connecting the first network component (e.g., via different ports) with several second network components could be utilized by transmitting frames across these lines, wherein data sent in such frames are aligned at the beginning of each such frame.

In a further embodiment, said data to be conveyed via the at least two lines are distributed substantially evenly across the at least one frame.

Hence, in particular to allow efficient pre-coding, the data can be distributed such that no or only a small (in particular a minimized) overlap of data conveyed at the same time (or frequency) is utilized. In other words, data sent over a first, a second and a third line are each distributed within a respective frame such that, e.g., all data are sent at different times, i.e. no (or minimal) overlap of data sent at a particular time occurs.

However, this sort of overlap can be correlated with a proximity to an adjacent line within, e.g., a multi-core cable. Hence, the lines that are next to one another inflict significant crosstalk interference. Data sent via such lines should have a minimized overlap, whereas data sent via lines that are not close to one another and do not inflict significant crosstalk may not have to be sent in different time and/or frequency domains.

In a next embodiment, said data comprises user data and idle data and wherein the user data and/or the idle data are distributed substantially equally across the at least one frame.

Thus, the data may be divided into such user data and idle data, wherein preferably the user data should be processed through the line(s) with as little crosstalk interference as possible. Therefore, user data could be distributed substantially equally across the at least one frame avoiding overlap (as far as feasible) with user data that is sent via adjacent lines at the same time (and or frequency) in the frame.

It is also an embodiment that said data comprises user data and idle data and wherein user data of interfering lines is aligned within the at least one frame such that they have limited overlap, in particular such that they show reduced crosstalk interference.

In particular, user data sent should be sent via such lines with limited overlap in the time and/or frequency domain, which lines inflict crosstalk interference to one another that may be above a predetermined threshold. Hence, user data may be separated as far as possible (in the time and/or in the frequency domain), which may lead to significant crosstalk (due to adjacent lines in, e.g., a multi-core cable).

Moreover, the alignment with regard to user data can be provided at the beginning of the frame(s) thereby allowing the pre-coding to efficiently start at the beginning of the frame. Hence, pre-coding can be processed until the frame ends thereby utilizing the whole duration of the frame for pre-coding purposes.

Pursuant to another embodiment, the limited overlap can be realized within a time domain and/or within a frequency domain.

As crosstalk interference can arise in the time and/or frequency domain of data conveyed over nearby lines, the countermeasure provided herewith also applies to both domains. If crosstalk can be observed in a frequency domain of adjacent lines, this crosstalk can be reduced by utilizing different frequencies (at different times) within a frame.

According to an embodiment, the first network component is a Central Office (CO) or a Digital Subscriber Line Access Multiplexer (DSLAM).

According to another embodiment, the at least one second network component is a customer-premises equipment (CPE).

The problem stated supra is also solved by a device for processing data comprising a processor unit that is equipped and/or arranged such that the method as described herein is executable on said processor unit.

In an embodiment, said device is a communication device, in particular a Central Office or a Digital Subscriber Line Access Multiplexer.

In another embodiment, the device comprises a pre-coding unit to run the method as described herein.

In a further embodiment, the device comprises a de-coding unit to run the method as described herein.

The problem is also solved by a communication system comprising a device as described herein.

Embodiments of the invention are shown and illustrated in the following figures:

DESCRIPTION OF THE INVENTION

It is an objective of the approach presented herewith to adjust a pre-coding effort. Therefore, transmission frames are aligned for different customer-premises equipments (CPEs) and user data and idle data are allocated such that an overall pre-coding gain is improved.

Figure 1:
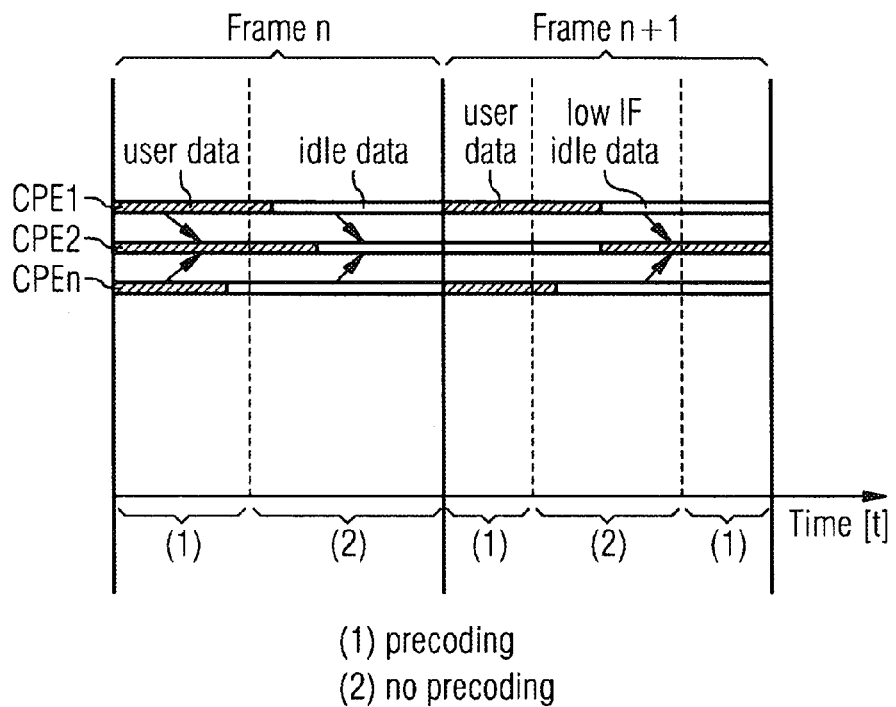
FIG. 1 shows a concept for partial crosstalk cancellation applying user data and idle data at certain areas within a transmission frame.

Two exemplary allocations of resources are shown in FIG. 1 for a Frame n and a Frame n+1.

Within the Frame n it is assumed that interference cannot be reduced for the respective idle data transmission portions generated for the different customer-premises equipments CPE1, CPE2 and CPEn. Hence, it may be advantageous to start transmitting user data for the respective customer-premises equipments CPE1, CPE2 and CPEn at the beginning of the transmission Frame n.

Pre-coding is performed for a portion of the transmission frame only, i.e. for the user data as shown in FIG. 1. This allows to reduce an overall processing effort compared to portions of user data that are randomly distributed within the Frame n. The pre-coding can also be performed until the subsequent Frame n+1 starts, i.e. the duration of the Frame n can be used for pre-coding purposes.

In the Frame n+1 of FIG. 1, an alternative distribution of user data and of low interference (IF) idle data is shown. Within the Frame n+1, an optimized allocation of user data is shown that can advantageously be used in case of idle data transmission with reduced or even no power. As in such case idle data over different lines to different customer-premises equipments CPE1, CPE2, CPEn do provide only limited interference (or even none at all) with user data, the user data may preferably be spread across the Frame n+1 such that it causes as little interference (with other user data on other lines) as possible.

Such spreading across the Frame n+1 can be realized, e.g., by allocating some user data at the end of the Frame n+1 and some user data at the beginning of the Frame n+1 as shown in FIG. 1.

However, the lines or channels may be selected according to a mutual interference with one another. Preferably, user data to be sent via lines that strongly interfere with each other may be located as far as possible from one another in different areas (e.g., within a time and/or a frequency domain) of the Frame n+1.

Subsequently, a pre-coding, i.e. an interference cancellation can be performed at the beginning and/or at the end of such Frame n+1, thereby reducing the residual interference.

Furthermore, the interference cancellation may also (as an alternative or in addition) performed at or around a midsection or generally within a frame in order to reduce the residual interference. This may be advantageous, because around a midsection of a frame a significant amount of crosstalk may be expected and can be thus reduced.

The interference may be reduced by separating interfering signals (transmitted across interfering lines) as much as possible. Such separation can be realized in the time domain as well as in the frequency domain. The latter may be achieved by, e.g., defining frequency sub-bands for each portion of idle data.

It may be a further issue to perform a pre-multiplexing of user data as well as of idle data. A reason for such pre-multiplexing is that due to bitloading, scrambling and interleaving there may be no direct mapping of idle data and user data to different time and frequency positions within the transmission frame (Frame n and Frame n+1 of FIG. 1).

The pre-multiplexing can be performed such that it considers the actual processing of the respective interleaver, scrambler and bitloader.

As these modules (scrambler, interleaver FEC mapper and bitloader) are known by the central office (CO) and as such modules advantageously perform linear transformations, a resulting bit location can be calculated in advance so that the allocation in time and frequency can be controlled by the central office. Hence, the central office allows to calculate the real positions of the user data as well as of the idle data and achieves a pre-processing according to the approach introduced herewith.

As an alternative, an inverse interleaver, an inverse scrambler, an inverse FEC mapper and an inverse bitloader can be used, to invert the effect of each module so that the module combined with its inversed module would have no impact on the data positions within the transmission frame.

This would simplify mapping of data into different areas or portions of the respective Frame (n or n+1) for the scheduler.

Particular advantages of the approach provided herewith can be summarized as follows:
(i) It is a significant benefit to apply this approach to systems that are not running at full capacity, i.e. systems that are not transmitting user data only without any idle data portions.
  As the actual ADSL/VDSL standards may not allow reducing power for idle data, the resulting crosstalk even of such idle data would significantly reduce the performance of a system.
  The proposed concept allows to align the pre-coding and hence to optimize the frame structure in a way that pre-coding affects mainly user data.
  Regarding idle data, crosstalk effects are irrelevant for idle data and pre-coding does not have to be processed for idle data. Hence, the pre-coding efforts can be concentrated on user data only thereby improving the overall performance of the system.
(ii) In addition, the power consumed for transmitting idle data may be reduced and/or no idle data at all may be transmitted.
  As a location within in each frame may be identified by the inverse means for scrambling, bitloading, interleaving and FEC mapping, the crosstalk can be controlled for user data and the overall performance gain can be maximized by crosstalk cancellation.

Figure 2:
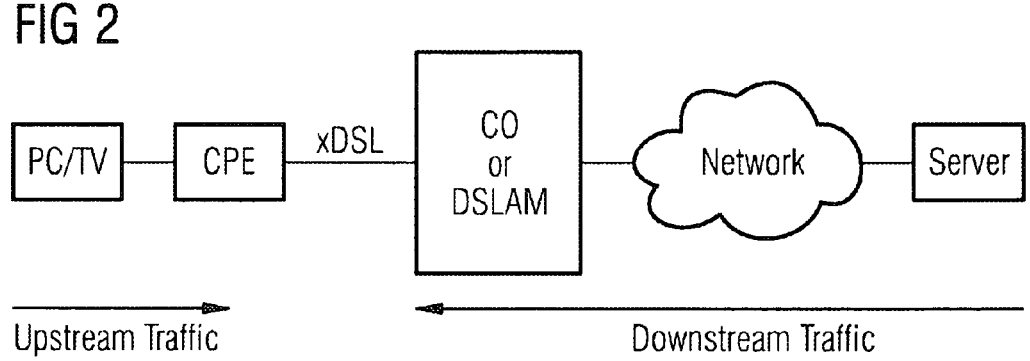
FIG. 2 shows a scenario comprising a communication network allowing to send data from a server to a client in particular via an xDSL connection.

A particular scenario of a communication network is shown in FIG. 2. Downstream Traffic is conveyed from the Server via a Network to a Central Office or Digital Subscriber Line Access Multiplexer CO/DSLAM. The CO/DSLAM is further connected via a digital subscriber line xDSL to a Customer-Premises Equipment CPE. The digital subscriber line connection can be in particular of the following type:

Asymmetric Digital Subscriber Line ADSL, ADSL2, ADSL2+;
High Data Rate Digital Subscriber Line HDSL;
Very High Speed Digital Subscriber Line VDSL, VDSL2.

The customer can be connected to the Customer-Premises Equipment CPE via a set-top box and a television or via a personal computer PC/TV. Data that is sent from the PC/TV towards the Server is referred to as Upstream Traffic.

Preferably, an operator or provider wants to efficiently use the xDSL downstream direction from the CO/DSLAM to the CPE by employing high data rate with low crosstalk effects.

The invention claimed is:

1. A method for reducing crosstalk interference in a digital subscriber line (DSL) environment, which comprises the steps of:
   transmitting data from a first network component to at least one second network component via at least two lines, and the data is transmitted in frames and containing user data and idle data; and
   distributing the data to be transmitted via the at least two lines within the frames, in terms of user data and idle data, substantially evenly or aligned to have limited overlap, wherein the limited overlap is in time domain.

2. The method according to claim 1, which comprises distributing the data within the at least one frame in order to improve an overall pre-coding gain.

3. The method according to claim 1, which comprises distributing the data to be conveyed via the at least two lines within the at least one frame in order to reduce and/or minimize a crosstalk interference.

4. The method according to claim 1, which comprises aligning the data to be conveyed via the at least two lines at a beginning of the at least one frame.

5. The method according to claim 1, wherein the distributing step comprises distributing the data to be conveyed via the at least two lines substantially evenly across the at least one frame.

6. The method according to claim 5, wherein the data comprises user data and idle data and the distributing step comprises distributing the user data and/or the idle data substantially evenly across the at least one frame.

7. The method according to claim 1, wherein user data of interfering lines is aligned within the at least one frame to have limited overlap.

8. The method according to claim 7, wherein the limited overlap is switched to a frequency domain.

9. The method according to claim 1, wherein the first network component is a Central Office or a Digital Subscriber Line Access Multiplexer.

10. The method according to claim 1, wherein the at least one second network component is a customer-premises equipment.

11. A device for processing data, comprising a processor unit programmed to execute the method according to claim 1.

12. The device according to claim 11, wherein said device is a communication device.

13. The device according to claim 11, wherein said device is a central office multiplexer or a digital subscriber line access multiplexer.

14. The device according to claim 11, which comprises a pre-coding unit programmed to execute the method according to claim 1.

15. The device according to claim 11, which comprises a de-coding unit programmed to execute the method according to claim 1.

16. A communication system, comprising a device for processing data, the device comprising a processor unit programmed to execute the method according to claim 1.

* * * * *